(12) United States Patent
Toda

(10) Patent No.: US 11,588,945 B2
(45) Date of Patent: Feb. 21, 2023

(54) DATA INPUT SUPPORT APPARATUS THAT DISPLAYS A WINDOW WITH AN ITEM VALUE DISPLAY AREA, AN OVERVIEW IMAGE DISPLAY AREA, AND AN ENLARGED IMAGE DISPLAY AREA

(71) Applicant: Canon Kabushiki Kaisha, Tokyo (JP)

(72) Inventor: Kohei Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/359,912

(22) Filed: Jun. 28, 2021

(65) Prior Publication Data
US 2021/0409550 A1    Dec. 30, 2021

(30) Foreign Application Priority Data

Jun. 29, 2020   (JP) ............................. JP2020-111897

(51) Int. Cl.
| H04N 1/04 | (2006.01) |
| H04N 1/00 | (2006.01) |
| G06V 30/412 | (2022.01) |
| G06V 30/414 | (2022.01) |
| G06V 30/416 | (2022.01) |
| G06V 30/10 | (2022.01) |

(52) U.S. Cl.
CPC ......... *H04N 1/0044* (2013.01); *G06V 30/412* (2022.01); *G06V 30/414* (2022.01); *G06V 30/416* (2022.01); *H04N 1/00331* (2013.01); *H04N 1/00816* (2013.01); *G06V 30/10* (2022.01)

(58) Field of Classification Search
None
See application file for complete search history.

(56) References Cited

U.S. PATENT DOCUMENTS

| 2016/0189314 A1* | 6/2016 | Nakayama ........... G06V 30/412 |
| | | 705/30 |
| 2017/0099403 A1* | 4/2017 | Honda ................. G06V 30/412 |
| 2019/0089849 A1* | 3/2019 | Yamazaki ............ G06V 30/413 |
| 2019/0228220 A1* | 7/2019 | Matsumoto ............ G06V 10/22 |
| 2019/0230232 A1* | 7/2019 | Soga .................. H04N 1/00331 |

(Continued)

FOREIGN PATENT DOCUMENTS

| JP | 2016051339 A | 4/2016 |
| JP | 2018037036 A | 3/2018 |

*Primary Examiner* — Dung D Tran
(74) *Attorney, Agent, or Firm* — Venable LLP

(57) ABSTRACT

The data input support apparatus in the present disclosure acquires item information relating to a combination of an item name and an item value described in a business form image based on character recognition results of the business form image, and displays an item value display area and an image preview display area having an overview image display area and an enlarged image display area. The item value display area displays an item value of an item name corresponding to a specific item type from the item information. The overview image display area displays the entire business form image or an overview image in which the displayed item value and the item name are highlighted. The enlarged image display area displays an enlarged image including the displayed item value. The display unit switches and displays display contents in the image preview display area in accordance with the acquired item information.

7 Claims, 13 Drawing Sheets

(56) References Cited

U.S. PATENT DOCUMENTS

| | | | |
|---|---|---|---|
| 2019/0266397 A1* | 8/2019 | Arakawa | G06V 30/418 |
| 2019/0370539 A1* | 12/2019 | Shimamura | G06T 3/0056 |
| 2020/0336611 A1* | 10/2020 | Soga | H04N 1/00411 |
| 2021/0227083 A1* | 7/2021 | Shiraishi | G06V 30/40 |

* cited by examiner

400

BILL

402 — November 8, 2019

BILL No. C013-65-4321

BILLER

ABC Inc.

〒123-4567

Address : 1-2-3, Nishi-shinjuku, Shinjuku-ku, Tokyo

| Biller TEL | 045-789-1234 | — 404

404a

BILLING

DEF Inc.

〒345-6789

Address : 4-5-6, Kohoku-ku, Yokohama-shi, Kanagawa

| Billing TEL | 012-345-6789 | — 405

405a

We will bill you as follows.

401a — | Total Amount | ¥11,286- | — 401

403a — | Due Date | December 8, 2019 | — 403

| No | Item Name | Quantity | Unit Price | Price |
|----|-----------|----------|------------|-------|
| 1 | pipe chair | 1 | 4,450 | 4,450 |
| 2 | trash box | 2 | 3,000 | 6,000 |
| | | | | |
| | | | | |
| | | | Subtotal | 10,450 |
| | | | Consumption Tax | 836 |
| | | | Total | 11,286 |

[Remarks]

※ This estimate will expire in one month from the issue date.

| No. | ITEM TYPE | PRIORITY | ITEM VALUE | ITEM NAME | NORMALIZING TYPE |
|---|---|---|---|---|---|
| 1 | BILLED AMOUNT | 1 | ¥11,286- | TOTAL AMOUNT | 11286.00 |
| 2 | ISSUE DATE | 1 | NOVEMBER 8, 2019 | - | 20191108 |
| 3 | ISSUE DATE | 2 | DECEMBER 8, 2019 | DUE DATE | 20191208 |
| 4 | PHONE NUMBER | 1 | 045-789-1234 | BILLER TEL | 0457891234 |
| 5 | BILLING TEL | 2 | 012-345-6789 | BILLER TEL | 0123456789 |

501

| BILLED AMOUNT | ISSUE DATE | BILLER PHONE NUMBER | BILLING PHONE NUMBER |
|---|---|---|---|
| - | ISSUE DATE | BILLER PHONE NUMBER | BILLING PHONE NUMBER |
| - | IssueDate | BILLER TEL | BILLING TEL |
| - | - | BILLER PHONE NUMBER | BILLING PHONE NUMBER |

EXTRACTION RESULTS

BILLED AMOUNT: ¥11,286-

ISSUE DATE: November 8, 2019

PHONE NUMBER: 045-789-1234

< BACK    ↑ TRANSMIT    NEXT >

EXTRACTION RESULTS

BILLED AMOUNT: ¥11,286-

ISSUE DATE: November 8, 2019

PHONE NUMBER: 045-789-1234

< BACK    ↑ TRANSMIT    NEXT >

BILLING
BILL No. C013-65-4321    November 8, 2019
DEF Inc.
〒345-6789
Address : 4-5-6, Kohoku-ku,
Yokohama-shi, Kanagawa
Billing TEL : 012-345-6789 as follows.
¥11,286-
Due Date    December 8, 2019

EXTRACTION RESULTS

| BILLED AMOUNT | ¥11,286- |
| ISSUE DATE | November 8, 2019 |
| PHONE NUMBER | 045-789-1234 |

< BACK  ⇧ TRANSMIT  NEXT >

1000
1001
1002

BILLER
ABC Inc.
〒123-4567
Address : 1-2-3, Nishi-shinjuku, Shinjuku-ku, Tokyo
Biller TEL : 045-789-1234
We will bill you as follows.
Total Amount :  ¥

DATA INPUT SUPPORT APPARATUS THAT DISPLAYS A WINDOW WITH AN ITEM VALUE DISPLAY AREA, AN OVERVIEW IMAGE DISPLAY AREA, AND AN ENLARGED IMAGE DISPLAY AREA

BACKGROUND OF THE DISCLOSURE

Field of the Disclosure

The present disclosure relates to a data input support apparatus, a data input support method, and a program.

Description of the Related Art

There is data input work to read necessary information from a paper business form used in accounting work and transfer the information to a system. Conventionally, there is a system that supports input work by reading a character string located at a predetermined position in a business form image as an item value and displaying it to a data input operator in order to support data input work. However, this method requires an operation to register the position of an item for each layout of a business form, and therefore, it is difficult to apply the method to a business form in which a variety of layouts may exist. For example, a bill is created by an issuer using its original template, and therefore, the layout is likely to become diverse.

Methods of automatically extracting data (item value) from a non-formatted business form for which it is difficult to register a template as described above have been disclosed in Japanese Patent Laid-Open No. 2016-51339 (in the following, Patent Document 1) and Japanese Patent Laid-Open No. 2018-37036 (in the following, Patent Document 2). In Patent Document 1, the item name, which is a character string representing the attribute of data, and the item value representing data are detected from character recognition results of an image and the item value is extracted by associating the item name and the item value with each other based on the positional relationship between both. In Patent Document 2, the item value is extracted by, after extracting the area of the reading-target item name and highlighting it, inputting an approximate position/area of the item value corresponding to the item name by a user.

As described above, by the methods disclosed in Patent Document 1 and Patent Document 2, it is possible to automatically extract the item value, but there is a case where the character recognition results of the extracted item value may be erroneous, and therefore, it is indispensable for an operator to perform visual confirmation. In Patent Document 1, a display method is disclosed, which displays the area of the recognition-target item value with a thick boxed line on the business form image as well as displaying the character recognition results of the item value in the recognition results area. Further, Patent Document 2 describes that the character image that is cut out from the business form image and the recognition results of the character image are displayed side by side.

In a case where a plurality of pieces of data. (numerical values and the like) of the same type exists within a business form, by confirming only the data of the recognition results, it is frequently difficult to determine whether the data is data corresponding to the desired item name. That is, in a case of confirming the recognition results of the item value, it is also necessary to confirm which item name the value corresponds to, which is extracted from the business form image as the value corresponding thereto.

However, in the display method disclosed in Patent Document 1 only the area that is the recognition target on the entire business form image is displayed with a thick-line frame. It is necessary for a user to find which character image area on the business form image the recognition results correspond to and further to confirm visually which item name the character image area corresponds to on the business form image, and therefore, it takes time to perform the confirmation operation. Further, in the display method disclosed in Patent Document 2, it is easy to confirm the character image corresponding to the character recognition. However, in order to confirm whether or not the character image corresponds to the correct item name, it is necessary to perform confirmation by separately displaying the entire business form image, and therefore, it takes time to perform the confirmation operation.

SUMMARY OF THE DISCLOSURE

The data input support apparatus in the present disclosure includes: a unit configured to acquire item information relating to a combination of an item name and an item value described in a business form image based on character recognition results of the business form image; and a display unit configured to display: an item value display area that displays an item value of an item name corresponding to a specific item type from the item information including the acquired combination of an item value and an item name; and a window including an image preview display area having an overview image display area that displays the entire business form image or an overview image in which the displayed item value and an item name corresponding to the displayed item value are highlighted, and an enlarged image display area that displays an enlarged image including the displayed item value or an enlarged image including the displayed item value and an item name corresponding to the item value, and the display unit switches and displays display contents in the image preview display area in accordance with the acquired item information.

Further features of the present disclosure will become apparent from the following description of exemplary embodiments with reference to the attached drawings.

BRIEF DESCRIPTION OF THE DRAWINGS

FIG. 4 is a diagram showing a business form image that is supposed in the first embodiment;

FIG. 5 is a diagram showing detection results obtained by taking the business form image as a target;

FIG. 9 is a diagram showing a database having a character string uniquely representing an item type;

FIG. 10 is a diagram showing a confirmation window in which the entire business form image is displayed in an overview image display area;

FIG. 11 is a diagram showing a confirmation window in which the entire business form image is displayed in the overview image display area;

FIG. 13 is a diagram showing a confirmation window 1000 in which an enlarged image display area is extended to an entire image preview area.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

In the present embodiment, a data input support apparatus is explained, which displays an item name and an item value that are extracted by taking a business form image 400 as a target.

First Embodiment

[Hardware Configuration]

Figure 1:
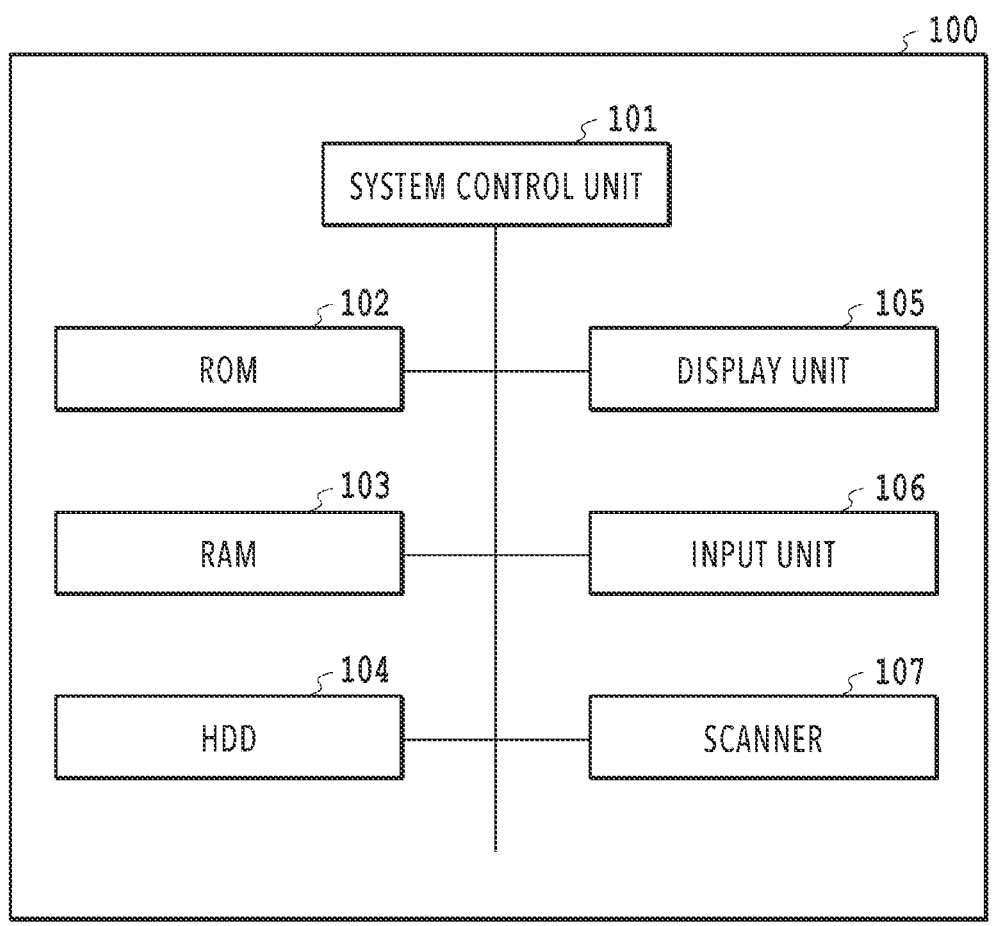
FIG. 1 is a diagram showing a hardware configuration of a data input support apparatus according to a first embodiment.

FIG. 1 is a diagram showing the hardware configuration of a data input support apparatus according to a first embodiment. A data input support apparatus 100 has a system control unit 101, a ROM 102, a RAM 103, an HDD 104, a display unit 105, an input unit 106, and a scanner unit 107.

The system control unit 101 reads control programs stored in the ROM 102 and performs various kinds of processing. The RAM 103 is used as a temporary storage area, such as a main memory and a work area, of the system control unit 101. The HDD 104 stores various kinds of data, various programs and the like. The functions and processing of the data input support apparatus 100, to be described later, are implemented by the system control unit 101 reading programs stored in the ROM 102 or the HDD 104 and executing the programs.

The display unit 105 displays various kinds of information. The input unit 106 has a keyboard and a mouse and receives various operations by a user. The display unit 105 and the input unit 106 may be integrated into one unit, like a touch panel. It may also be possible for the display unit 105 to perform projection with a projector and for the input unit 106 to recognize the position of a fingertip for a projected image with a camera.

The scanner 107 reads a paper surface and generates a scanned image. The scanner 107 is not limited to a contact-type scanner and it may also be possible to use a document camera and a smartphone as a non-contact-type scanner.

In the present embodiment, the scanner 107 reads a paper document, such as a business form, and generates a business form image and the image is stored in a storage device, such as the HDD 104.

[UI]

Figure 2:
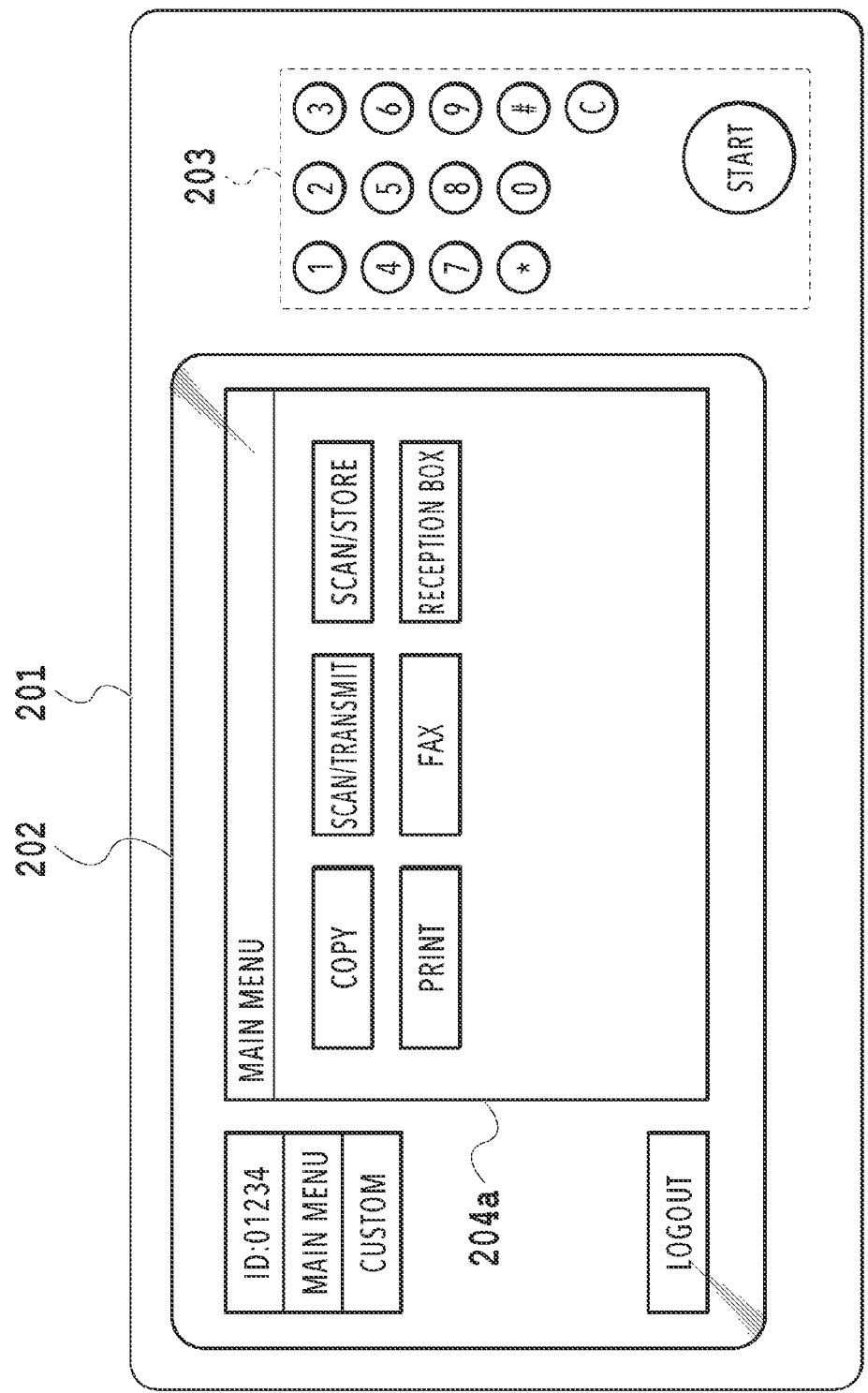
FIG. 2 is a diagram showing a UI that implements a display unit and an input unit of the data input support apparatus of the present embodiment.

FIG. 2 is a diagram showing a UI (User Interface) that implements the display unit 105 and the input unit 106 of the data input support apparatus 100 in the present embodiment. An operation panel 201 implements the display unit 105. The operation panel 201 comprises a touch panel 202 and a ten-key pad 203. On the touch panel 202, a user ID of a user who has logged in, a main menu and the like are displayed.

In the present embodiment, the UI is one way for providing a processing-target business form image, results extracted from a business form image and the like to a user and provided on the touch panel 202. The display of the UI is not limited to the touch panel and it may also be possible to display the UI by using a display connected to a PC.

[Software Configuration]

Figure 3:
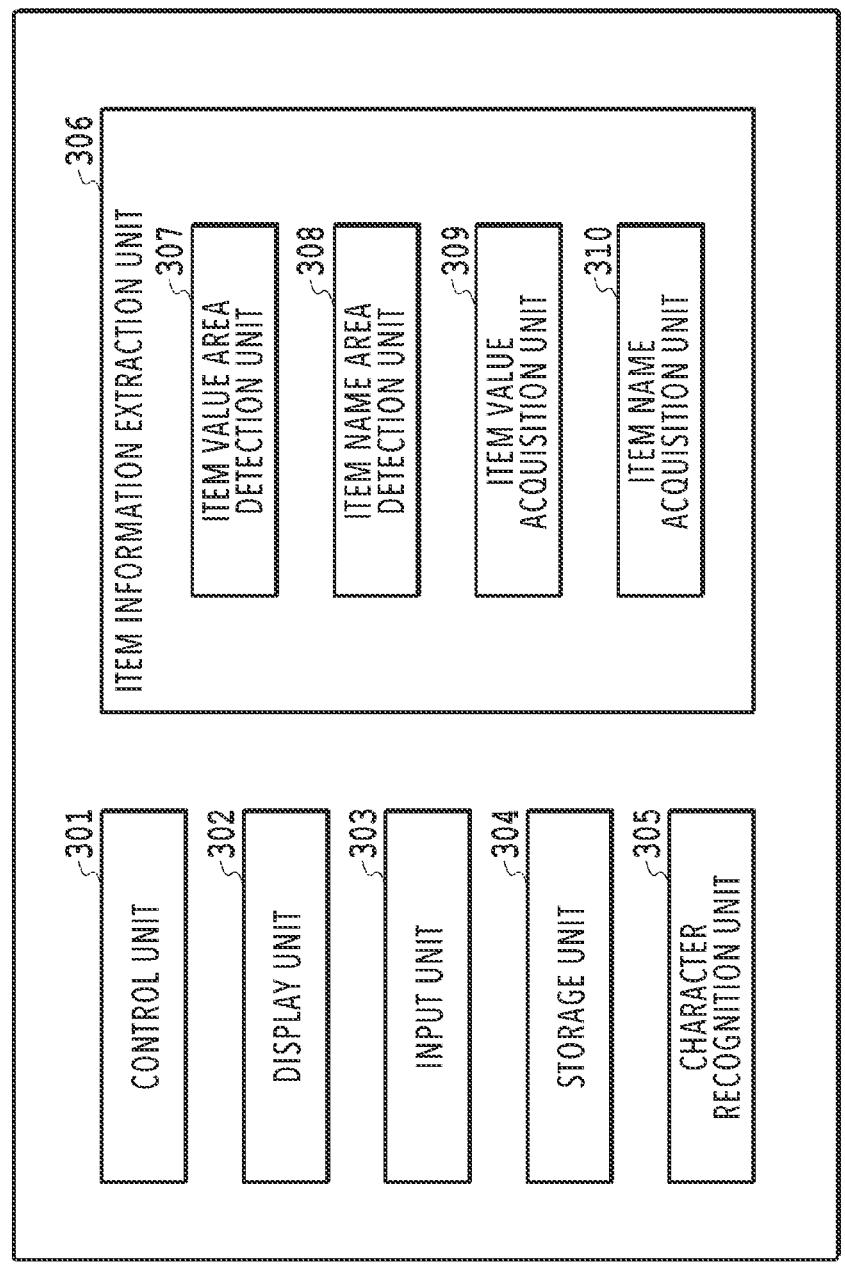
FIG. 3 is a configuration diagram showing a software configuration of units that implement the data input support apparatus of the present embodiment.

FIG. 3 is a configuration diagram showing the software configuration of units implementing the data input support apparatus 100. The data input support apparatus 100 includes various modules (301 to 310). Programs that implement software are stored in the ROM 102 or the HDD 104.

The control unit 301 controls programs and gives instructions to the various modules and performs management.

The display unit 302 provides a UT for a user to operate the software of the data input support apparatus 100 and results of various kinds of processing to the display unit 105 in accordance with instructions from the control unit 301.

The input unit 303 receives the operation of a user to the software.

The storage unit 304 stores programs and other pieces of information managed by the programs in the ROM 102 or the HDD 104.

The character recognition unit 305 specifies the coordinates and character type of a character or a character string described in a business form image.

The item information extraction unit 306 extracts an item that is the target of the data input work from a business form image as item information. The item information extraction unit 306 further has the sub modules (307 to 310).

The item value area detection unit 307 detects the area in which the character string that is the target data of the data input work is described from a business form image as an item value area.

The item name area detection unit 308 detects the area in which the character string representing the name of the item value is described from a business form image as an item name area.

The item value acquisition unit 309 acquires the character string in the item value area that is obtained by the character recognition unit 305 as an item value.

The item name acquisition unit 310 acquires the character string in the item name area that is obtained by the character recognition unit 305 as an item name.

It is possible to acquire the item value area, the item name area, the item value, and the item name by a publicly known method, such as the method disclosed in Patent Document 1.

It is not necessary for the character recognition unit 305 to take the character strings of the entire business form image as a target and it is only required for the character strings necessary for the item value acquisition unit 309 and the item name acquisition unit 210 to be recognized. For example, it is possible to reduce the amount of calculation by determining, after extracting a character candidate area, that the area is not the item name or the item value based on the position and the size of the area, the layout between the areas and the like, and not specifying the character type.

[Item Detection Results]

FIG. 4 is a diagram showing the business form image 400 that is supposed in the present embodiment. FIG. 5 shows detection results 501 obtained by applying the item information extraction unit 306 to the business form image 400 as a target. In the detection results 501 in FIG. 5, the extracted item information is described in each row and a plurality of pieces of item information is enumerated. The item information has the item type, the priority, the item value, the item name, and the normalizing type. Further, although not shown schematically, the item information has area information, which is vertex coordinates of the area, for each item value and each item name. Areas 401 to 405 in FIG. 4 are item value areas corresponding to item values of No. 1 to No. 5 in FIG. 5, respectively. Similarly, areas 401*a*, 403*a*, 404*a*, and 405*a* are item name areas corresponding to item names, respectively, except for the item name of No. 2.

The item type indicates the type of extracted item information. In the detection results 501, three types of item information are detected: "Billed Amount" item, "Issue Date" item, and "Phone Number" item. The priority is the order that is determined based on the degree of probability that the item information including the combination of the acquired item value and the item name corresponding thereto is the correct item type among the item types of the same type. The item value is an item value indicated 1*w* the item information and is also a character string that is described in the business form image. The item name is a character string corresponding to the item type. For example, as the item name corresponding to the "Billed Amount" item in the detection results 501, "Total Amount" is detected.

The normalizing type is a character string obtained by normalizing the item value into a format determined for each item type. For example, in the "Issue Date" item, a format of "YYYYMMDD" is taken as the normalizing type and in No. 2 in the detection results 501, "Nov. 8, 2019" is converted into "20191108" and this is the character string of the normalizing type. Similarly, in the "Billed Amount" item, conversion is performed by taking a "real number with two decimal places" as the normalizing type and in the "Phone Number" item, conversion is performed by taking a "character sting including only figures" as the normalizing type. Due to this, the variation in the description of the item value for each business form is eliminated.

[Processing Flow]

Figure 6:
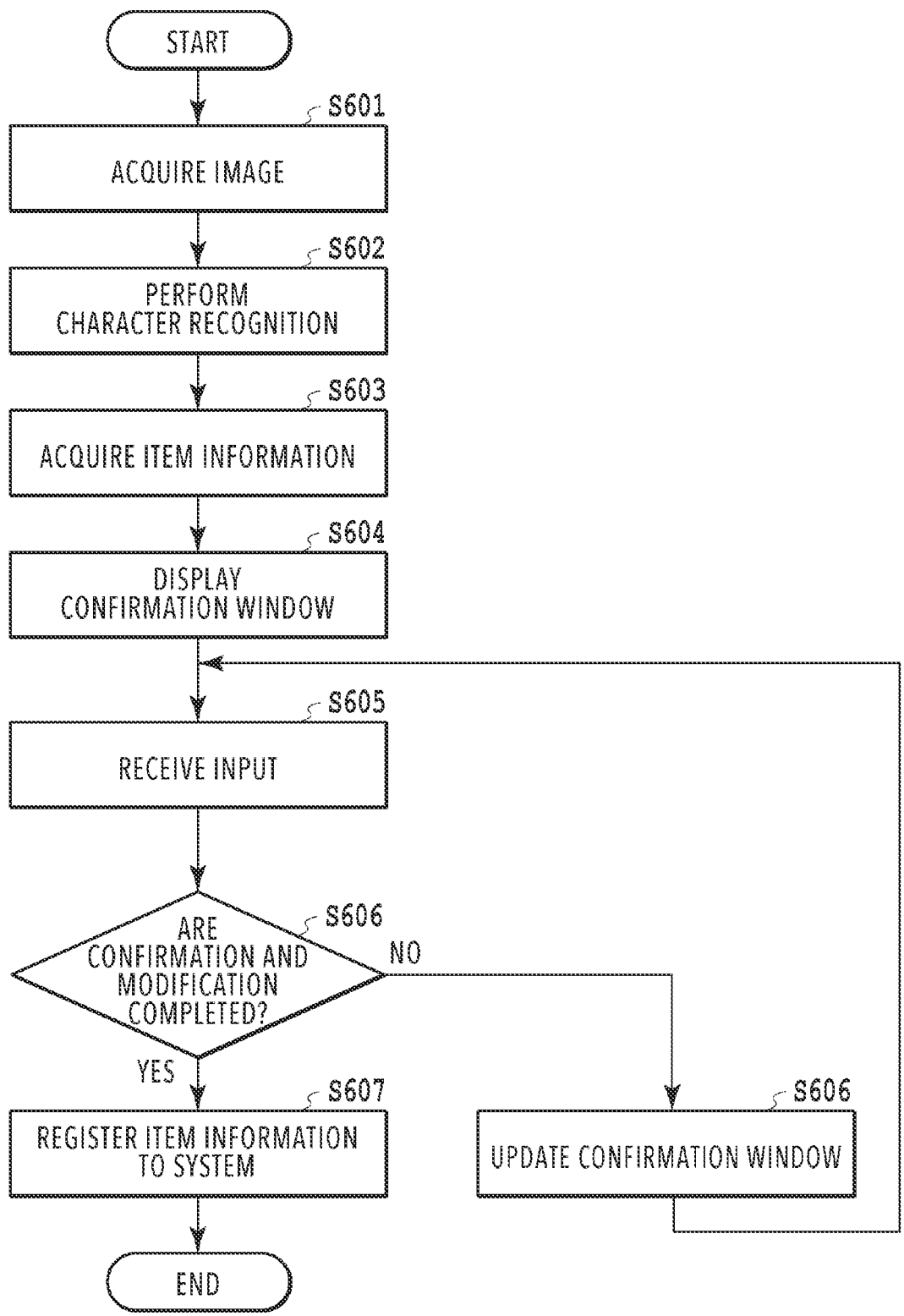
FIG. 6 is a diagram showing a processing flow of software that implements the first embodiment.

A processing flow of the software that implements the present embodiment is explained by using FIG. 6.

At step S601, the control unit 301 acquires the business form image 400 stored in the HDD 104.

At step 602, the character recognition unit 305 performs character recognition processing by taking the business form image 400 as a target. Due to this, each character string area and the character type in the business form image 400 are obtained as recognition results.

At step S603, the item information extraction unit 306 acquires item information from the business form image 400 based on the character recognition results. Due to this, the detection results 501 are obtained.

At step S604, the display unit 302 presents the business form mage 400 and the detection results 501 to a user and for each of the detection results, constructs and displays a confirmation window for confirming and modifying the item value corresponding to the extracted item type. This processing will be described later by using FIG. 7 and the subsequent drawings.

At step S605, the input unit 303 acquires a user operation via the input unit 106. Here, a user confirms and modifies the detection results 501. In a case where the confirmation and modification are completed based on the input contents of a user, the processing transitions to S607 and in other cases, the confirmation window is updated at S606 and the reception of a user input is performed again.

Lastly, at step S607, the control unit 304 transmits the item information for which the confirmation and modification by a user have been completed to an external system, not shown schematically, and the processing is terminated,

[Confirmation Window]

Figure 7:
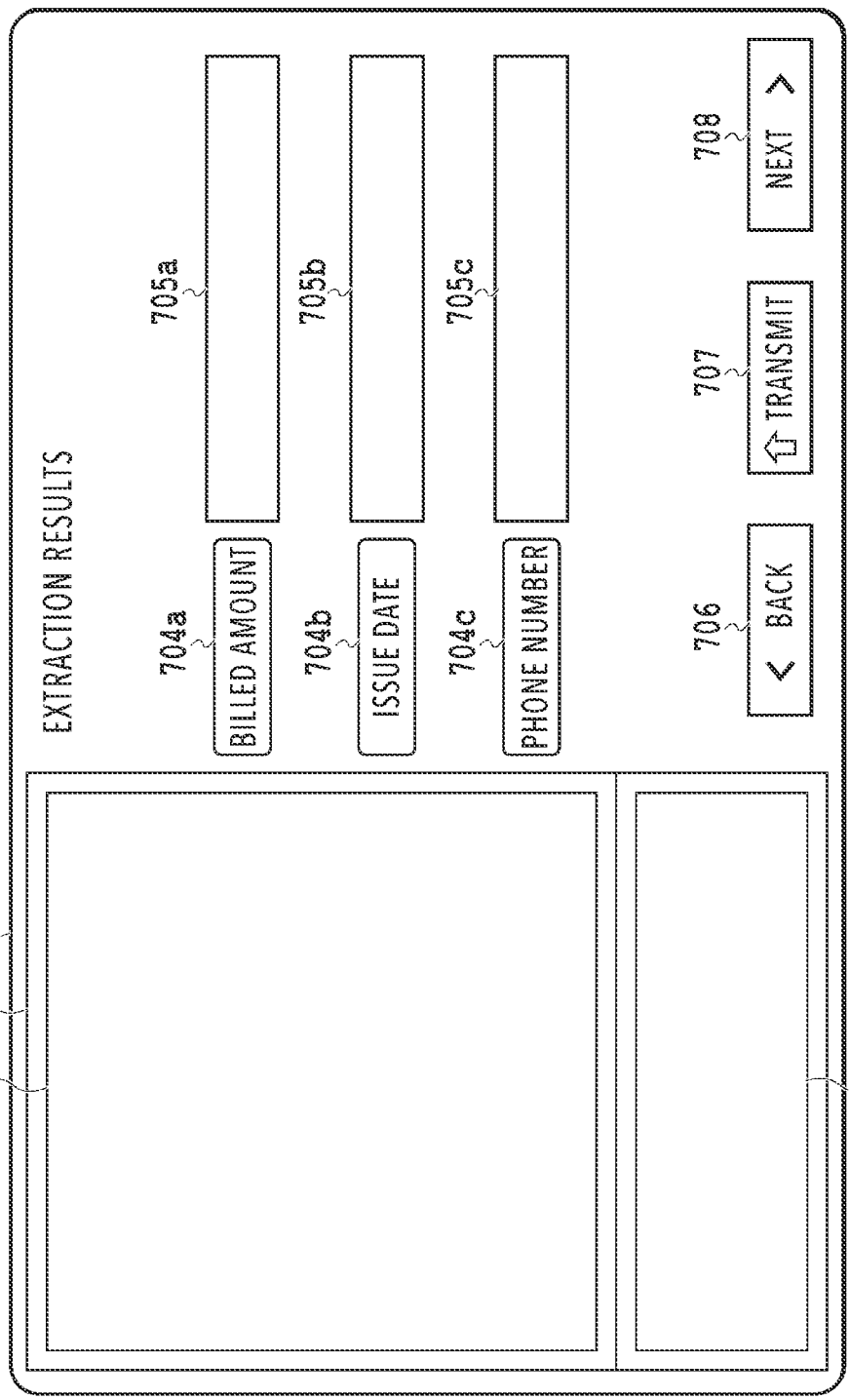
FIG. 7 is a diagram showing a confirmation window that is constructed by the di splay unit.

FIG. 7 is a diagram showing a confirmation window 700 that is constructed by the display unit at step S604 in the processing flow. The confirmation window 700 presents the contents of the detection results 501 to a user. A user confirms whether the item value is detected from the correct area and whether the correct value is extracted in the confirmation window 700 and modifies an error that exists. The confirmation window 700 includes an image preview display area 701 having an overview image display area 702 and an enlarged image display area 703. Further, the confirmation window 700 includes item type text 704*a* to 704*c* and item value text 705*a* to 705*c* as item value display areas, a move-to-previous page button 706, a Transmit button 707, and a move-to-next page button 708. However, in the confirmation window 700, specific display contents that are displayed in the confirmation window are not shown.

The image preview display area 701 includes the overview image display area 702 and the enlarged image display area 703. The display contents in the overview image display area 702 and the enlarged image display area 703 are switched in accordance with the detection results. Further, in a case where the overview image display area 702 is not displayed, the image preview display area 701 includes only the enlarged image display area 703.

In the overview image display area 702, an overview image is created and displayed, in which the areas 401, 402, and 404 corresponding to the item information (No. 1, No. 2, No. 4 in FIG. 5) whose priority in the detection results 501 is 1 are highlighted for the business form image 400. However, depending on the creation method of an overview image, the areas (No. 3, No. 5 in FIG. 5) corresponding to the item information whose priority is 2 are also highlighted. Further, there is a case where the overview image is not created from the results of the item name in the detection results 501 and the overview image display area is not displayed. The creation method of an overview image will be described later by using FIG. 8 to FIG. 11. It is possible for a user to change the display position and the display magnification of an overview image by performing the swipe operation and the pinch-in/pinch-out operation on the overview image display area 702.

The enlarged image display area 703 is an image that is created from the item value area and the item name area corresponding to the areas highlighted in the overview image display area 702. The creation method of an enlarged image will be described later by using FIG. 8 to FIG. 11. It is possible for a user to select an enlarged image at step S605. In a case where an enlarged image is selected, the item value text is acquired from the item information corresponding to the enlarged image and displayed. Further, it is possible for a user to change the display position and the display magnification of an overview image by performing the swipe operation and the pinch-in/pinch-out operation on the enlarged image display area 703.

The item type text 704*a* to 704*c* in the item value display area displays the name of the item type that is transmitted to the external system at step S607 in FIG. 6, In the confirmation window 700, "Billed Amount" is displayed in the item type text 704*a*, "Issue Date" is displayed in the item type text 704*b*, and "Phone Number" is displayed in the item type text 704*c*.

The item value text 705*a* to 705*c* in the item value display area is text areas in which the item values corresponding to the areas highlighted in the overview image display area 702 are displayed. Among the detection results 501, the item value of the item information whose priority of the combination of the item value and the item name corresponding thereto is 1 of the item information corresponding to the item type of the item type text is displayed. It is possible for a user to input to each text area and in a case where there is an error in the character string recognition results, modification is performed here. In a case where a user selects a text area, the image preview display area 701 switches to a display optimum for confirming the corresponding item value.

The move-to-previous page button 706 is a button for returning to the confirmation window 700 of the business form image one before while performing the confirmation operation of a plurality of business form images. In a case of desiring to perform again the confirmation operation of the previous business form image, a user presses down the move-to-previous page button 706 and returns to the confirmation window 700 of the business form image one before and performs the confirmation and modification operation.

The Transmit button 707 is a button for terminating the confirmation window 700 and transmitting the item type text 704*a* to 704*c* to an external system at step S607. After the confirmation and modification operation of the results of the detection results 501 in the confirmation window 700 is completed, a user terminates the confirmation operation by pressing down the Transmit button 707.

The move-to-next page button 708 is a button for advancing to the confirmation window 700 of the next business form image while performing the confirmation operation of a plurality of business form images. In a case where a user has completed the confirmation and modification operation of the current business form image and desires to perform the confirmation and modification operation of the next business form image, the user presses down the move-to-next page button to advance to the confirmation window 700 of the next business form image and performs the confirmation and modification operation.

[Display of Image Preview Display Area]

Figure 8:
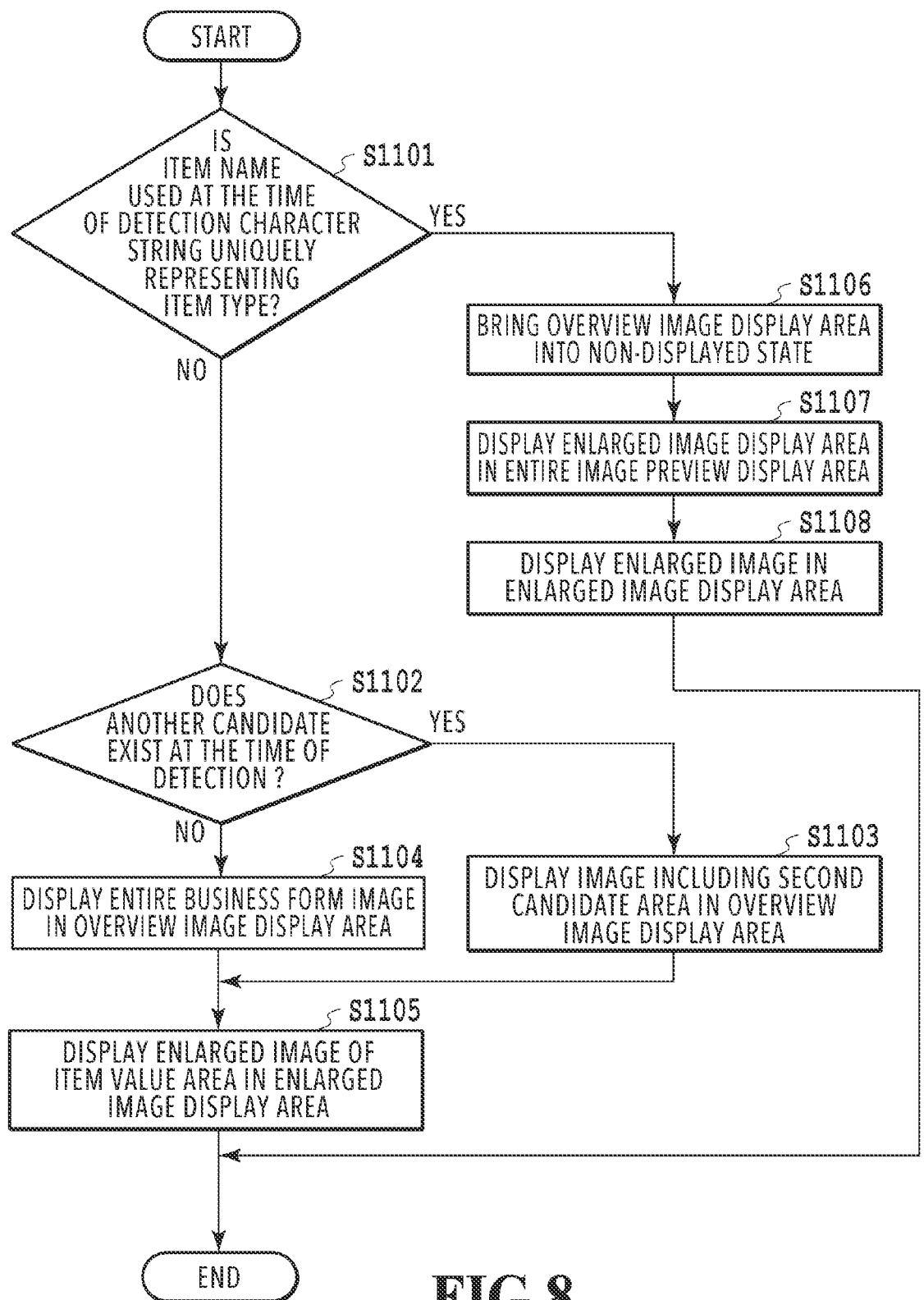
FIG. 8 is a diagram showing a processing flow to display an overview image and an enlarged image.

FIG. 8 shows a processing flow to switch and display the display contents in the overview image display area and the enlarged image display area in accordance with the detection results in the image preview display area 701. Here, the flow to switch the display contents in the image preview display area 701 by taking the detection results 501 as a target is explained. The processing at steps S1101 to S1108 is performed for each item type ("Billed Amount", "Issue Date", "Phone Number") extracted from the detection results.

(1) The display flow of the overview image display area and the enlarged image display area in a case where there is one item value candidate for one specific item type for which confirmation and modification are performed is explained by taking the item type "Billed Amount" of the detection results 501 as an example.

At S1101, whether the item name used at the time of detection of the item value is a character string uniquely representing the item type is determined. This determination is performed by referring to an item type database 1200 created in advance.

FIG. 9 shows a database having a character string uniquely representing the item type. The item type database 1200 stores the item type for which detection is performed and one or a plurality of character strings uniquely representing the item type. In the example shown in FIG. 5, the item value of the item type "Billed Amount" is detected by using the item name of "Total Amount", As a result of referring to the item type database 1200, the character string uniquely representing "Billed Amount" is only one, that is, "Billed Amount", and therefore, it is determined that the character string of the item name used at the time of detection does not represent the item type uniquely.

At step S1102, whether another candidate exists at the time of detection of the item value is determined. Another candidate of the item value of the item type does not exist in the detection results 501, and therefore, the processing flow advances to steps S1104, S1105.

At step S1104, in the overview image display area, the entire business form image is displayed, like an overview image 801 shown in FIG. 10.

At step S1105, in the enlarged image display area, the item value area detected like an enlarged image 802, that is, in this example, the enlarged image of the item value of the item type "Billed Amount" is displayed with the size being adjusted to the size of the enlarged image display area and this processing flow is terminated.

As described above, by displaying the initial display of an image preview display area 800, it is possible to reduce the time and effort that is required for the confirmation operation of the detection position of the item value, which is performed by a user. Further, it is also made easier to perform the confirmation operation of the item value.

(2) The display flow of the overview image display area and the enlarged image display area in a case where a plurality of item value candidates is obtained for one item type for which confirmation and modification are performed and it is not possible to distinguish them with the item name is explained by taking the item type "Issue Date" in the detection results 501 as an example.

At step S1101, it is determined that the item name of the item type does not represent the item type uniquely based on the detection results 501 and the item type database, and therefore, the processing flow advances to step S1102.

At step S1102, Nov. 8, 2019 and Dec. 8, 2019 are detected as the item values of "Issue Date" in the detection results 501, and therefore, it is determined that another candidate exists and the processing advances to step S1103.

At step S1103, in the overview image display area, an overview image 901 shown in FIG. 11 is displayed.

At step S1105, in the enlarged image display area, the item value area detected like an enlarged image 902*a*, that is, in this example, the enlarged image of the item value of the item type "Issue Date" is displayed with the size being adjusted to the size of the enlarged image display area and this processing flow is terminated.

Figure 12:
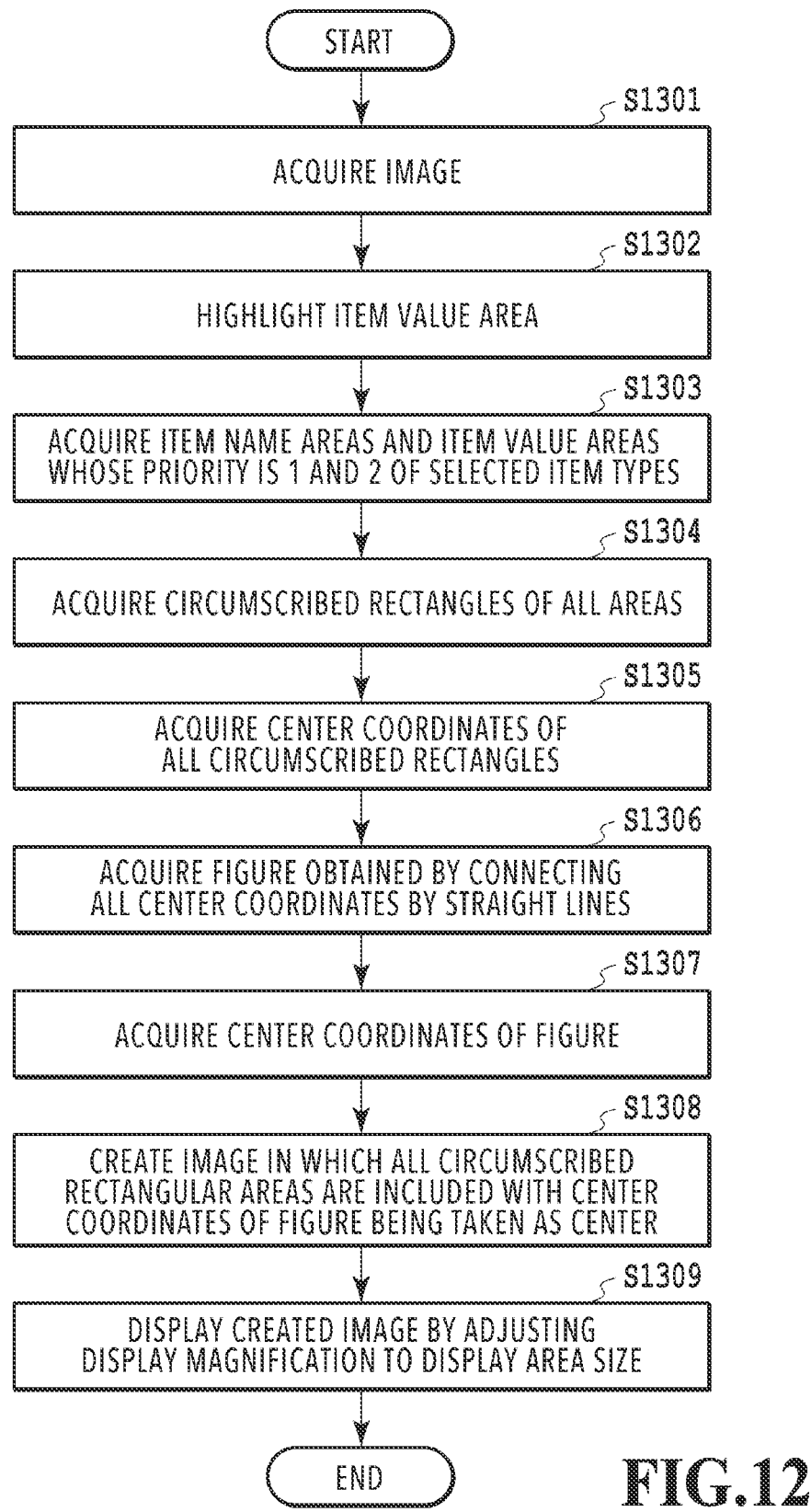
FIG. 12 is a diagram showing a creation flow of the overview image.

With reference to FIG. 12, the creation method of the overview image 901 is explained.

At step S1301, the business form image is acquired.

At step S1302, the item value area is highlighted. In this highlighting, all the item value areas obtained as the detection results 501 are highlighted.

At S1303, the item name areas and the item value areas whose priority is 1 and 2 of the selected item types are acquired. In a case where the item type "Issue Date" is selected, the item value areas and the item name areas of No. 2 and No. 3 in the detection results 501 are acquired.

At step S1304, a circumscribed rectangle of each of all the item name areas and all the item value areas acquired at step S1301 is acquired.

At step S1305, center coordinates of each circumscribed rectangle are acquired.

At step S1306, a figure obtained by connecting each center coordinates by straight lines is acquired. In a case of the item type "Issue Date", the figure is a triangle obtained by connecting the centers of the three areas of the item name 903 and the item values 904, 905 of No. 2 and No. 3 in the detection results 501.

At step S1307, the center coordinates of the figure acquired at step S1306, here, the triangle are acquired.

At step S1308, an image in which the circumscribed rectangular areas of the three areas are included is created with the center coordinates of the figure being taken as its center. The image area that is created at this time is an image area that is the minimum area including the circumscribed rectangular areas to which a certain width is added in the vertical direction and in the horizontal direction, not an area that is the minimum, area including the circumscribed rectangular areas.

At step S1309, the display magnification of the created image is adjusted to the size of the overview image display area 901 so that the image whose size is the maximum is displayed, and then, this processing is terminated.

Further, by a user selecting the highlighted area within the overview image, it is possible to switch the image that is displayed in the enlarged image display area to another. In this example, by selecting the item value area (Dec. 8, 2019) whose priority is 2, the image that is displayed in the enlarged image display area is switched from the enlarged image 902a to an enlarged image 902b.

By displaying the display as described above in the image preview display area, the confirmation operation of the detection position of the item value and the item value, which is performed by a user, is made easier in a case where a plurality of item value candidates exists. Particularly, in a case where the extraction position of the item value whose priority is 1 is wrong and the operation to find a correct item value anew occurs, it is made possible to mitigate the confirmation operation because the extraction position of the item value whose priority is 2 is displayed in advance.

(3) The display flow of the overview image display area and the enlarged image display area in a case where a plurality of item value candidates exists for one item type for which confirmation and modification are performed, but it is possible to uniquely determine the item value is explained by taking the item type "Phone Number" in the detection results 501 as an example.

Returning to the processing flow in FIG. 8, at step S1101, by the detection results 501 and the item type database 1200, it is determined that the item name of the item type represents the item type uniquely.

At step S1106, the overview image display area is no longer displayed like an overview image display area 1001 as shown in FIG. 13.

At step S1107, an enlarged image display area 1002 is enlarged to the entire image preview area.

At step S1108, in the enlarged image display area 1002, the enlarged image that is enlarged with the detected item name ("Biller TEL") and the detected item value ("045-789-1234") being taken as a center is displayed and this processing flow is terminated. This enlarged image includes the item name area and the item value area and is adjusted and displayed so that the character size in each area is displayed larger than a predetermined size on the enlarged image.

By displaying the initial display such as this, in a case where it is considered that the confirmation of the detection position is not necessary in the confirmation operation of the detection position of the item value and the item value, which is performed by a user, it is made possible to perform the confirmation operation of the item value preferentially, and therefore, it is possible to reduce the load of the confirmation and modification operation.

As above, in the present embodiment, the display contents that are displayed in the image preview display area are switched in accordance with the detection results of the item type for which the confirmation and modification operation is performed. Due to this, the operation in a case where the extraction position of the item value is not correct and the confirmation operation in a case where a plurality of extraction candidates exists for the same item type are made easier.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s), The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, even in a case where the extraction position of the item value is not correct or in a case where a plurality of item values of the same type is extracted and it is not possible to distinguish them by the item name, it is possible to reduce the time that is taken for confirming whether or not extraction is correct by displaying an image display optimum for the confirmation of each item value in the image preview display area.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-111897, filed Jun. 29, 2020 which is hereby incorporated by reference wherein in its entirety.

What is claimed is:

1. A data input support apparatus comprising:
a memory that stores instructions; and
a processor that executes the instructions to perform:
acquiring item information relating to a combination of an item name and an item value described in a business form image based on character recognition results of the business form image; and
displaying a window that includes an item value display area, an overview image display area, and an enlarged image display area,
wherein the item value display area displays an item value of an item name corresponding to a specific item type from the acquired item information including the combination of an item value and an item name,
  wherein the overview image display area displays an overview image of the business form image in which the displayed item value and an item name corresponding to the displayed item value are highlighted,
  wherein the enlarged image display area displays an enlarged image of the business form image so that a portion corresponding to the displayed item value is enlarged, and
  wherein the overview image display area displays the overview image of the business form image in which combinations of item values and item names whose probability of being the specific item type are high are highlighted in a case where there is a plurality of candidates corresponding to the specific item type.

2. The data input support apparatus according to claim 1, wherein
  the overview image display area displays the overview image of the business form image without highlighting an item value and an item name in a case where there is no combination of the item value and the item name corresponding uniquely to the specific item type.

3. The data input support apparatus according to claim 1, wherein
  an enlarged image corresponding to the displayed item value is displayed in the enlarged image display area without displaying the overview image display area in a case where there is a combination corresponding uniquely to the specific item type.

4. The data input support apparatus according to claim 1, wherein the processor executes the instructions to further perform:
  receiving selection of an item value area on the overview image displayed in the overview image display area and
  displaying, in the enlarged image display area, an enlarged image of the business form image so that a portion corresponding to the selected item value area is displayed.

5. The data input support apparatus according to claim 1, wherein
  the item value display area displays an item value of an item name whose probability of being the specific item type is the highest from the acquired item information including the combination of an item value and an item name corresponding to the item value.

6. A data input support method comprising:
  an acquisition step of acquiring item information relating to a combination of an item name and an item value described in a business form image based on character recognition results of the business form image; and
  a display step of displaying a window that includes an item value display area, an overview image display area, and an enlarged image display area:
    wherein the item value display area displays an item value of an item name corresponding to a specific item type from the acquired item information including the combination of an item value and an item name,
    wherein the overview image display area displays an overview image of the business form image in which the displayed item value and an item name corresponding to the displayed item value are highlighted,
    wherein the enlarged image display area displays an enlarged image of the business form image so that a portion corresponding to the displayed item value is enlarged, and
    wherein, at the display step, the overview image display area displays the overview image of the business form image in which combinations of item values and item names whose probability of being the specific item type are high are highlighted in a case where there is a plurality of candidates corresponding to the specific item type.

7. A non-transitory computer readable storage medium storing a program for causing a computer perform:
  acquiring item information relating to a combination of an item name and an item value described in a business form image based on character recognition results of the business form image; and
  displaying a window that includes an item value display area, an overview image display area, and an enlarged image display area:
    wherein the item value display area displays an item value of an item name corresponding to a specific item type from the acquired item information including the combination of an item value and an item name,
    wherein the overview image display area displays an overview image of the business form image in which the displayed item value and an item name corresponding to the displayed item value are highlighted,
    wherein the enlarged image display area displays an enlarged image of the business form image so that a portion corresponding to the displayed item value is enlarged, and
    wherein, in the displaying the window, the overview image display area displays the overview image of the business form image in which combinations of item values and item names whose probability of being the specific item type are high are highlighted in a case where there is a plurality of candidates corresponding to the specific item type.

* * * * *